(12) United States Patent  
Elliott

(10) Patent No.: US 10,408,642 B2  
(45) Date of Patent: Sep. 10, 2019

(54) DUTY CYCLE MODULATION FOR INDUCTIVE POSITION SENSORS

(71) Applicant: KSR IP Holdings, LLC, Wilmington, DE (US)

(72) Inventor: Ryan W. Elliott, Chatham (CA)

(73) Assignee: KSR IP Holdings LLC, Wilmington, DE (US)

( * ) Notice: Subject to any disclaimer, the term of this patent is extended or adjusted under 35 U.S.C. 154(b) by 15 days.

(21) Appl. No.: 15/802,202

(22) Filed: Nov. 2, 2017

(65) Prior Publication Data

US 2019/0025089 A1 Jan. 24, 2019

Related U.S. Application Data

(60) Provisional application No. 62/416,561, filed on Nov. 2, 2016.

(51) Int. Cl.
| | |
|---|---|
| G01D 5/22 | (2006.01) |
| G01D 5/20 | (2006.01) |
| H02J 1/00 | (2006.01) |
| H04B 1/00 | (2006.01) |
| G06F 1/00 | (2006.01) |

(52) U.S. Cl.
CPC ......... *G01D 5/2225* (2013.01); *G01D 5/2053* (2013.01)

(58) Field of Classification Search
CPC ................. H02J 1/00; H04B 1/00; G06F 1/00
See application file for complete search history.

(56) References Cited

U.S. PATENT DOCUMENTS

| | | | |
|---|---|---|---|
| 4,922,199 A | 5/1990 | Fukui et al. | |
| 6,005,387 A | 12/1999 | Andermo et al. | |
| 6,603,306 B1 | 8/2003 | Olsson et al. | |
| 7,443,154 B1* | 10/2008 | Merewether | G01V 3/104 |
| | | | 324/67 |
| 7,446,443 B2 | 11/2008 | Naganuma et al. | |
| 7,538,544 B2 | 5/2009 | Lee | |
| 8,098,061 B2 | 1/2012 | Elliott et al. | |
| 8,508,242 B2 | 8/2013 | Shao et al. | |
| 2010/0271012 A1* | 10/2010 | Patterson | G01B 7/004 |
| | | | 324/207.15 |
| 2012/0223700 A1* | 9/2012 | Shao | G01B 7/30 |
| | | | 324/207.16 |
| 2012/0293166 A1* | 11/2012 | Lee | G01D 5/2046 |
| | | | 324/207.17 |
| 2013/0119773 A1* | 5/2013 | Davis | H02J 5/005 |
| | | | 307/104 |
| 2015/0001960 A1 | 1/2015 | Niizuma | |
| 2016/0329748 A1* | 11/2016 | White, II | H01F 38/14 |

FOREIGN PATENT DOCUMENTS

JP        H06229707 A        8/1994

OTHER PUBLICATIONS

International Search Report dated Mar. 21, 2018; PCT/US2017/059752 filed on Nov. 2, 2017.

\* cited by examiner

*Primary Examiner* — Jermele M Hollington  
*Assistant Examiner* — Temilade S Rhodes-Vivour  
(74) *Attorney, Agent, or Firm* — Dinsmore & Shohl LLP

(57) ABSTRACT

A duty cycle is used in conjunction with a powered oscillator to electronically reduce the current draw by reducing the average tail current and thus reducing the sensor radiated emissions without altering an inductive position sensor. The duty cycle enables an on and an off cycling without altering the hardware but providing the improvements.

19 Claims, 11 Drawing Sheets

DUTY CYCLE MODULATION FOR INDUCTIVE POSITION SENSORS

CROSS-REFERENCE TO RELATED APPLICATIONS

The present utility patent application claims priority benefit of the U.S. provisional application for patent Ser. No. 62/416,561, filed on Nov. 2, 2016, under 35 U.S.C. 119(e).

FIELD OF THE INVENTION

The present invention relates to position sensor emissions and, more specifically, using a duty cycle to control a position sensor emissions.

BACKGROUND OF THE INVENTION

In the automotive field, position sensors are well known in the art. A typical arrangement has a single exciter and multiple receiving coils positioned at some gap apart from each other such that a coupler creates eddy currents in the receiving coil under constant excitation. Other position sensors known in the art function as an air-core transformer. A position sensor that functions as the air-core transformer, at its simplest, includes an excitation coil, an output coil, and a sensor coil. The excitation coil is electrically excited with an excitation signal. The output coil is inductively coupled to the excitation coil upon electrical excitation of the excitation coil. The sensor coil is electrically shorted and upon electrical excitation of the excitation coil, is inductively coupled to at least one of the excitation coil or the output coil.

Other known variations of position sensors include a signal source, an excitation coil, an output coil or a plurality of differently wound output coils, and a sensor coil. The signal source is operable to supply an excitation signal. The excitation coil is coupled to receive the excitation signal. The output coil is inductively coupled to the excitation coil upon excitation of the excitation coil with the excitation signal, to thereby supply an output signal. The sensor coil is electrically shorted and upon excitation of the excitation coil with the excitation signal, is inductively coupled to at least one of the excitation coil or the output coil, thus the output signal varies with movement of the sensor coil.

Example inductive position sensing units such as those disclosed in U.S. Pat. Nos. 7,538,544, 7,446,443, 8,098,061 and 8,508,242 may disclose a constant powered oscillator used to power the position sensor. However, as seen in these oscillating position sensors which, generally, include an air gap, there is a large amount of radiated emissions that occur at the operating frequency. As a result, emission standards have been established to set peak and average emission limits. The peak emission limit is set by the maximum amplitude of the oscillation, whereas the average is set by how long the oscillation is active over a set amount of time. Generally, for sampling and complexity reasons, the DC power oscillator is constantly on; however, with the new emission standards, particularly in Europe, there is peak and average emission limits between the AM radio and a 5 MHz frequencies that position sensors must now not exceed to pass the standards.

As such, it is desirable to control the inductive position sensor's peak and average emission values without comprising performance.

SUMMARY OF THE INVENTION

A position sensor system includes an inductive position sensor and a control unit. The position sensor is configured to have a constant excitation upon a single exciter and at least one receiving coil. The control unit includes an oscillator drive. The control unit is operably connected to control a signal from the oscillator drive to the position sensor. Further, the control unit is configured to control a start duty cycle and a stop duty cycle. The start duty cycle is configured to initiate the signal to the oscillator drive which in turn collects a sample from the position sensor. The stop duty cycle is configured to inhibit the oscillator drive which in turn shuts off the position sensor. The start duty cycle and the stop duty cycle operate at a predefined frequency and a predefined ratio to provide the sample the position sensor. The pulse of the start duty cycle and the stop duty cycle is configured to reduce an average radiated emission.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
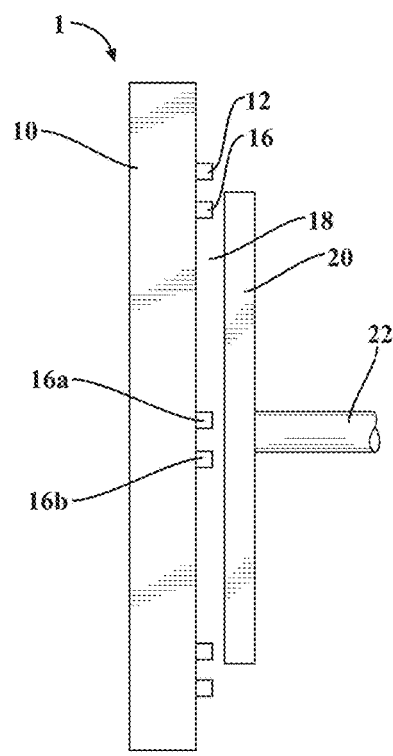
FIG. 1 schematically depicts a side view of an example inductive position sensor, according to one or more embodiments shown and described herein.

A position sensor system includes an inductive position sensor and a control unit. The position sensor is configured to have a constant excitation upon a single exciter and at least one receiving coil. The control unit includes an oscillator drive. The control unit is operably connected to control a signal from the oscillator drive to the position sensor. Further, the control unit is configured to control a start duty cycle and a stop duty cycle. The start duty cycle is configured to initiate the signal to the oscillator drive which in turn collects a sample from the position sensor. The stop duty cycle is configured to inhibit the oscillator drive which in turn shuts off the position sensor. The duty cycle is used in conjunction with the oscillator to electronically oversample the position sensor system to a predetermined output data rate to allow the system to be shut off, which results in a reduction in the current draw by reducing the average current and thus reducing the sensor radiated emissions without altering the inductive position sensor. The duty cycle enables an on and an off cycling without altering the hardware but providing the improvements as described herein.

In representative examples, the inductive position sensor includes a transmitter coil and a receiver coil, both formed by printed circuit techniques on printed circuit board. Inductive coupling between the transmitter coil and receiver coil induces a receiver signal in the receiver coil when the transmitter coil is excited, for example by an alternating current source. A coupler element, attached to the movable object, spatially modifies the inductive coupling between the transmitter coil and the receiver coil, allowing the receiver signal to be used to find the position of the movable object.

Inductive position sensors are described that employ a transmitter coil (sometimes called an exciter coil) powered by a current source, a receiver coil (or pickup coil) for generating an induced signal in response to the time varying magnetic field generated by the transmitter coil, and an electrically conductive element positioned proximate to the coils such that the time varying magnetic field generates eddy currents in the coupler element which modify the currents induced in the receiver as a function of the position of the coupler element.

The coupler element is connected to a movable part whose position is to be measured, such as the throttle pedal of an automotive vehicle, such that the angular (or rotational) position of the couplet is a function of the position of the throttle element. Thus, the voltage induced in the receiver or pickup coil is varied; by detecting the received voltage, the position of the coupler element, and thus the throttle pedal may be determined. This signal may be used to control the speed of the vehicle engine.

In one example, the transmitter coil, receiver coil, and the reference coil are printed on a printed circuit board, which may be a multi-layer printed circuit board. In other examples, the coils can be formed on separate structures.

In each of these inductive position sensors, there is an airgap between a board and a coupling. The larger the gap, the lower the coupling, and the lower the received signals. It is within this airgap that causes the emissions problems. When the airgap is maintained at a lower value, there is a reduction in emissions, thus a reduction is the peak and average radiated emissions. As the gap is increased so does the radiated emissions. A low physical airgap however is not feasible to be manufactured in mass at a low cost. Hence the need for the position sensor that is able to control the emissions produced by the airgap and to be manufactured in mass quantities at a low cost.

In addition, the excitation signal is used to generate a sensed signal, which allows the current configuration of the duty cycled inductive position sensor to operate on systems in the 2 KHz or less range and provides an advantage of also using the high operating frequency, generally in the 4 MHz range. Furthermore, using the excitation signal permits the output data to transfer at the slower rate using modulation, while still using a higher sample rate internally.

Further, the duty cycle power oscillation reduces a current draw from a total current used by an application specific integrated circuit (ASIC) and a tail current. As a result, the radiated emission from the sensor relative to the oscillation is reduced without comprising performance.

Given the above, and referring to the attached illustration, FIG. 1 schematically depicts an example inductive position sensor. The inductive position sensor 1 includes a first transmitter coil 12 and a first receiver coil 16, both formed by printed circuit techniques on printed circuit board 10. Inductive coupling between the first transmitter coil 12 and the first receiver coil 16 induces a receiver signal in the first receiver coil 16 when the first transmitter coil 12 is excited, for example by an alternating current source. A first coupler element 20, attached to the movable object, spatially modifies the inductive coupling between the first transmitter coil 12 and the first receiver coil 16, allowing the receiver signal to be used to find the position of the movable object.

The first coupler element 20, formed of an electrically conductive material, supported substantially parallel to and proximate to a circuit board 10, thus creating a first airgap 18 between the first coupler element 20 and the circuit board 10. The first transmitter coil 12 consists of one or more imprinted loops having a generally semicircular configuration, formed on a printed circuit board (PCB) 10. An oscillator drive 14 (shown in FIG. 3), which may be formed on the same PCB and may be controlled by an electronic control unit 58 (shown on FIG. 3), is connected to the transmitter coil and provides a current (the excitation signal) to the transmitter coil, generating an alternating electromagnetic field, which subsequently induces signals in other proximate coils through inductive coupling.

The first receiver coil 16 has an outer perimeter which is preferably within the area defined by the first transmitter coil 12. In this example, the receiver coil includes first and second loop configurations, 16 a and 16 b, each of which represents an approximately 54 degree sector of a circular area. The two loops 16 a and 16 b are connected by a reversing connection (not illustrated), with no electrical connection between the crossing electrical conductors. This receiver coil is configured such that if a current flows in the receiver coil 16, the current would flow in reverse directions in the sections 16 a and 16 b. When a clockwise current flows in section 16 a, a counterclockwise current flows in section 16 b. The first coupler element 20 is rotated around a shaft 22 by connecting member (not shown) in a plane substantially parallel to the plane of the transmitter and receiver coils.

Figure 2:
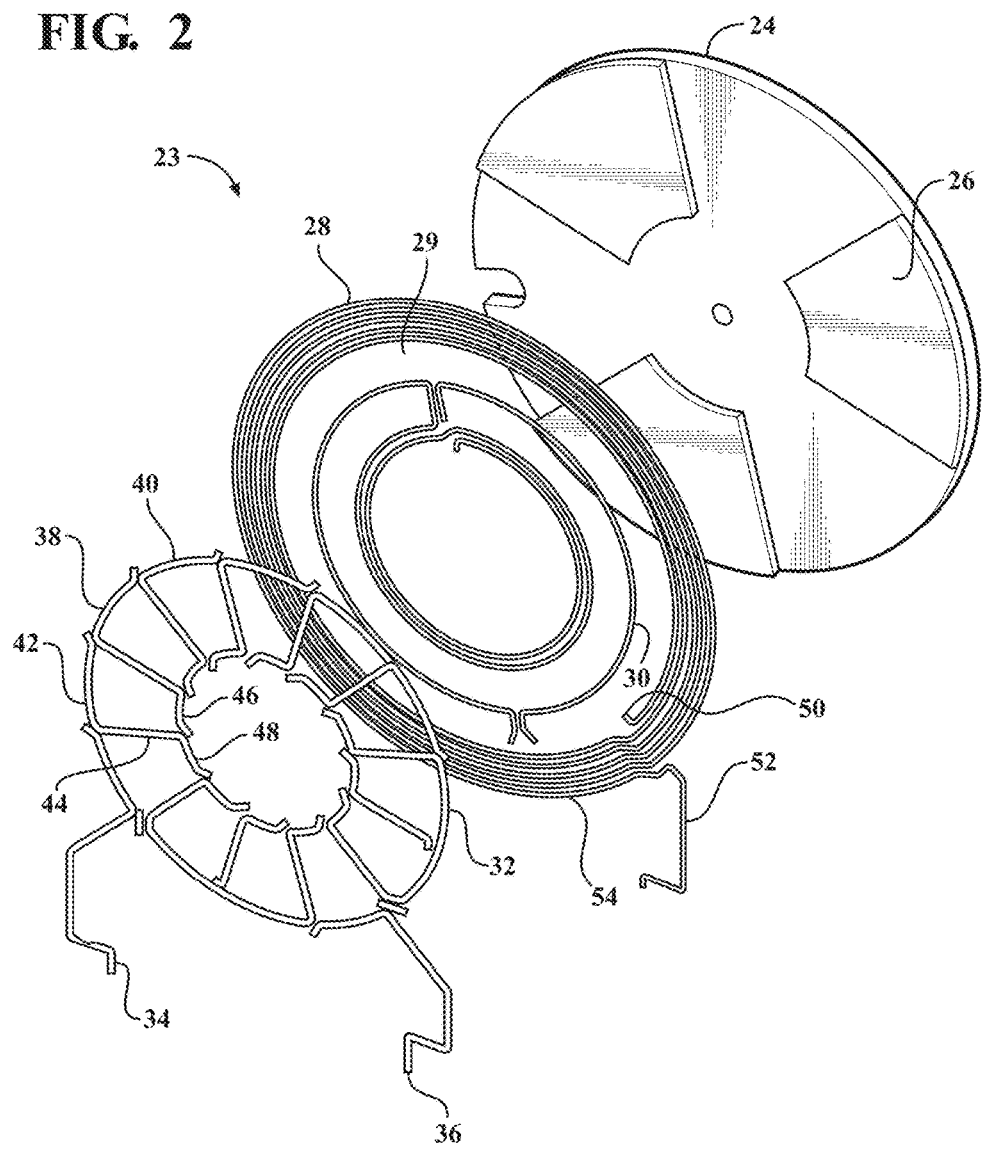
FIG. 2 schematically depicts another example of an inductive position sensor, according to one or more embodiments shown and described herein.

FIG. 2 illustrates a further example of an inductive position sensor 23, including a rotating disk 24 having a plurality of electrically conducting patches, such as a second coupler element 26. The inductive position sensor 23 further includes a second transmitter coil 28, a reference coil 30, and a second receiver coil 32. The second transmitter coil 28 is proximate to the second coupler element 26 so to form a second airgap 29 between the second transmitter coil 28 and the second coupler element 26. The second transmitter coil 28 is excited by a current source (not illustrated) connected to the transmitter coil ends 50 and 52. The excited transmitter coil generates an electromagnetic field, which induces signals in the reference coil 30 and the second receiver coil 32 by inductive coupling. The inductive coupling between the second transmitter coil 28 and both the reference coil 30 and the signal coil is modified (reduced) by the coupler elements such as the second coupler element 26. However, the inductive coupling between the transmitter coil and the reference coil is not sensitive to the angular position of the rotating coupler. In contrast, the receiver signal is sensitive to the angular position of the rotating disk 24, so that a ratio of the receiver signal and the reference signal is correlated with the angular position of the rotating coupler while also being corrected for common mode factors, such as the gal, between the transmitter coil and the rotating disk. The receiver signal is obtained between receiver coil ends 34 and 36.

The outer periphery of the second receiver coil comprises sequential segments, such as 42, 38, and 40, in which sequential segments alternate as being part of a first loop configuration or a second loop configuration. For example, outer segment 38 is part of the same loop configuration as inner segment 46, connected by a radial spoke 44, both part of a first loop configuration, whereas outer segments 40, 42, and inner segment 48 are pail of a second loop configuration. As illustrated, a radial spoke such as 44, part of the second loop configuration, conceals a second radial spoke behind it, the concealed spoke being part of the first loop configuration. The two loop configurations are interconnected by a reversing connection so that a first signal in the first loop configuration, and a second signal in the second loop configuration, oppose each other, and may cancel out if the inductive coupling to each of the two loops is the same. The cancellation may occur, for example, if the rotating coupler is removed. In position sensor applications, if the rotating coupler element can move to a position where the inductive coupling to one loop configuration is reduced, and the inductive coupling to the other loop configuration is increased, changing the receiver signal in a manner correlated with coupler element position.

In this example, the first loop configuration comprises a number of radially extending lobes, formed by an inner segment, a radial spoke, an outer segment, a radial spoke, an inner segment, and so on. The radial lobes of the first and second loop configurations alternate within the second receiver coil shown in FIG. 2. Also, as shown in the example FIG. 2, the second coupler element is a segment having an angular width twice the angular width of a radial lobe of the first or second loop configurations. As shown, the second receiver coil substantially entirely formed of radial conductors, or elements orthogonal to a radial direction.

Figure 3:
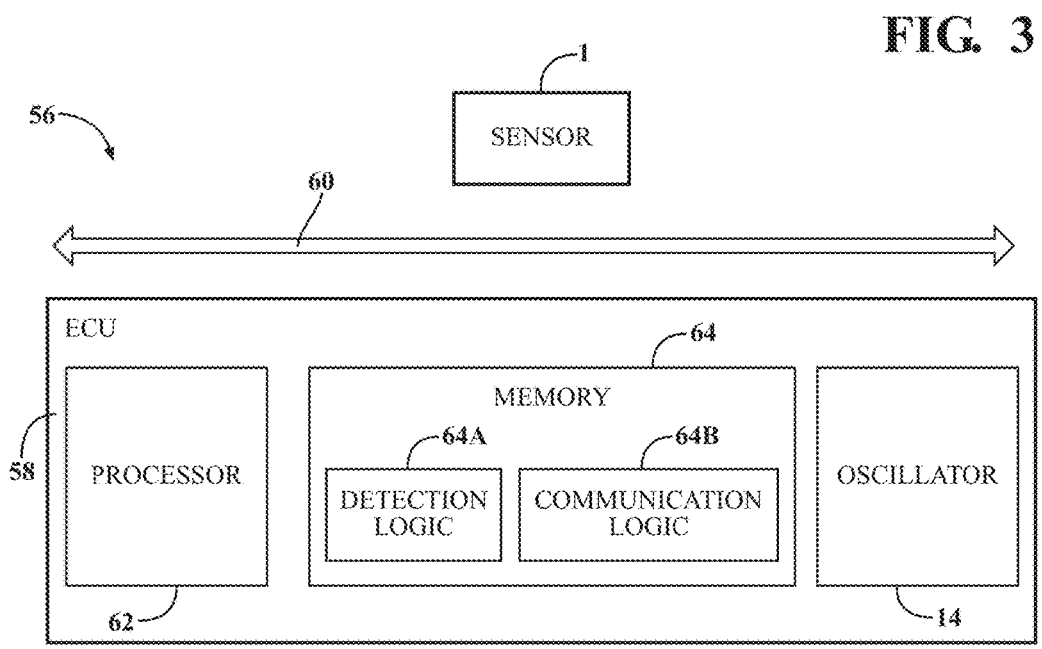
FIG. 3 schematically depicts an environment of a system for controlling the inductive position sensor, according to one or more embodiments shown and described herein.

FIG. 3 schematically depicts an environment of a system for controlling the inductive position sensor, such as the inductive sensor of FIG. 1 or 2. As illustrated, the system 56 includes the sensor 1, in communication with an electronic control unit 58 and a transceiver 60. The transceiver 60 is in electrical communication with the electronic control unit 58 and is connected to the sensor 1, to couple the electronic control unit 58 to the inductive sensor 1.

As depicted in FIG. 3, the electronic control unit 58 includes the oscillator drive 14, a processor 62 and a memory component 64 coupled to the processor 62. The memory component 64 stores logic, such as, a detection logic 64a, and a communication logic 64b, as illustrated in FIG. 3.

Figure 4:
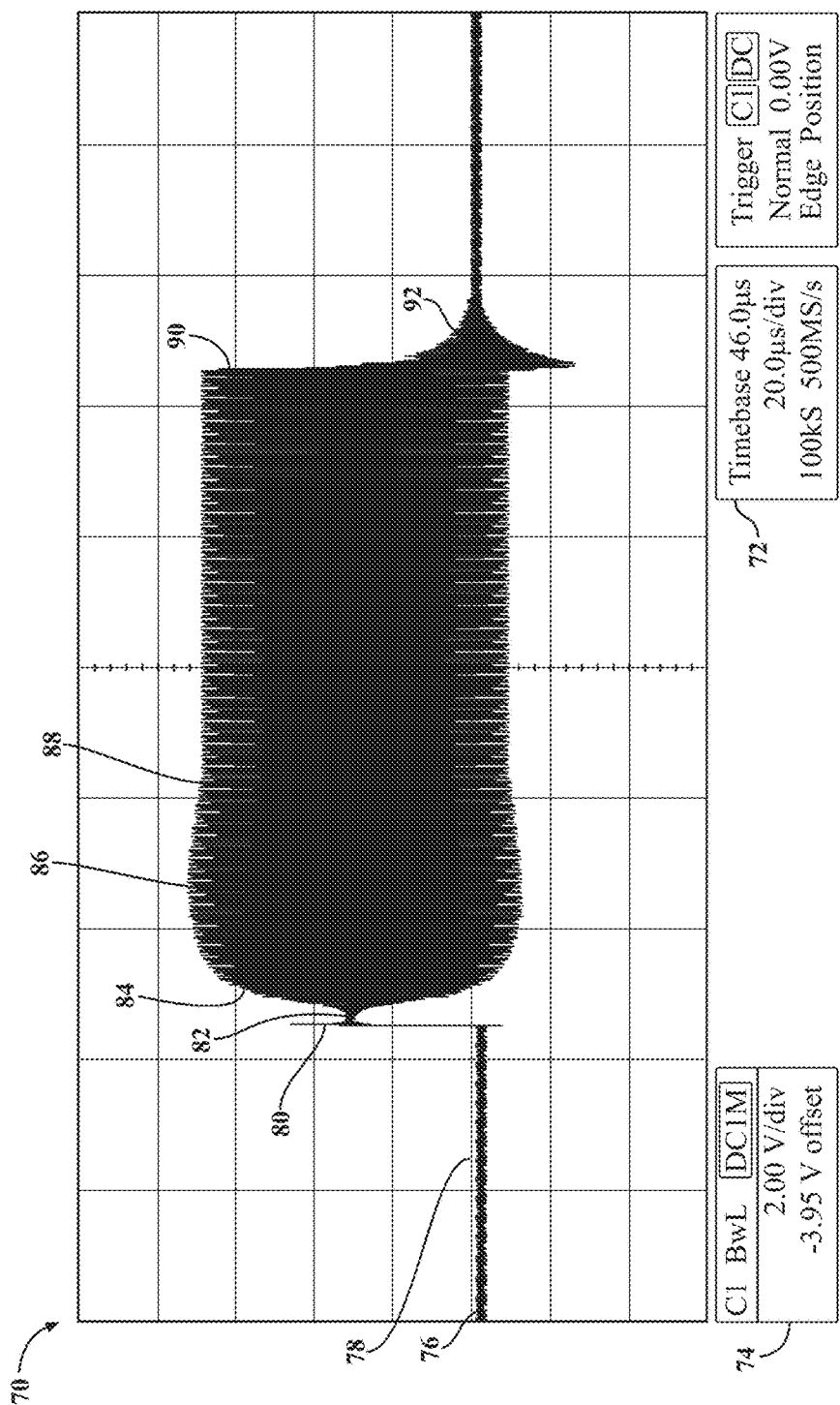
FIG. 4 is a characteristic curve of a 10% duty cycle modulation of the inductive position sensor, according to one or more embodiments shown and described herein.

FIG. 4 generally depicts a characteristic curve of a 10% duty cycle pulse width modulation of an oscillating inductive position sensor. The duty cycle pulse width modulation as described herein is operably connected to the example inductive sensor 1 having an airgap 18 between the sensing board (printed circuit board) 10 and coupler element 20 or the example inductive sensor 23 having an airgap 29 between the transmitter coil 28 and the coupler element 26. It should be appreciated that the duty cycle pulse width modulation is not limited to these two inductive sensors and may be applied to any inductive sensor having an airgap. Further, it should also be appreciated that the larger the airgap, the lower the coupling and the lower strength of signal received. Therefore, to compensate, the control current is varied to increase the excitation voltage to maintain a constant input voltage on the received signal side of the position sensor. Moreover, the current supplied to power the oscillation is a tail current denoted in milliamps (mA).

The characteristic curve 70 of the pulse width modulation duty cycle of 10% is shown over a pulse width period 72 of a predetermined amount of time, such as, without limitation, 800 μs. It should be appreciated, and shown in FIGS. 7-12 below, that the predetermined amount of time may range from 200, 400, 800 hertz (Hz) (½, ¼, to ⅛$^{th}$) of a nominal 1600 Hz data rate. Further, the predetermined amount of time, as illustrated here in FIG. 4 corresponds from a first edge 84 to a second edge 90. It should also be appreciated that the first edge 84 and the second edge 90, while illustrated over a set period of time, does not necessary need to be set at a known period and only require a minimum of time to allow the oscillation to become established to allow for a stable reading of the received signals; thus, an off time may be variable. Further, the characteristic curve is illustrated with the voltage parameters 74 of a 2.00 V/div and −3.95 V offset, however, these parameters should not be indicative of limiting the scope of the claims and are merely for illustrative purposes. Further, it should be appreciated that the time between sequential second edge 90 to the first edge 84, or from the beginning of on period until the next on period is but may be any interval of time, as shown in FIGS. 7-12 below, and as those skilled in the art would appreciate.

Initially the curve 70 is illustrated between periods where the electronic control unit 58 is not enabling a current 76 to be high and the duty cycle is not active; thus, the current 76 is not being applied to the oscillator drive 14. Therefore the current and modulation is maintained at a baseline 78. When the electronic control unit 58 enables the current 76 high so to power the oscillator drive 14 which in turn spikes 80 upon excitation of the position sensor 1. Almost simultaneously, as illustrated here in FIG. 4, when the current 76 powers the oscillator drive 14 with constant DC current 82, the duty cycle is also requested on, therefore the signal is modulated at the first edge 84. The oscillation peaks 86 but the oscillation settles and becomes established 88 over the period 72 (remainder of curve until second edge 90) to allow for the stable reading of the received signals modulation. During this period of stable reading, a sample is being taken and held onto until another sample is taken. It should be appreciated that the sample being taken and held onto until another sample is taken is generally in analog systems. For digital output systems, generally the digital output rate may be at the lower rate or the system may hold or repeat multiples of the same value. It should also be appreciated that while 10% modulation is shown in the figures and described for ease of the reader, it is in no way limiting and the duty cycle (shown in FIG. 5) may be anywhere from 0% to 100%.

When the pulse width period 72 is reached, the electronic control unit 58 inhibits the oscillator drive 14, thus the modulation ends at the second edge 90 and the current 76 returns to an oscillation 92 near the baseline 78 until the current 76 settles along the baseline 78 until the next duty cycle period 72 and oscillation drive 14 are both enabled.

It should be appreciated that the operating frequency may vary but, in a preferred embodiment, the operating frequency is 400 Hz. Further, as a result of the modulation, a peak value of radiated emission and the average radiated emission 98 (shown in FIG. 5) between edges 84 and 90, reduces the oscillation and thus reduces the average radiated emissions 98 (shown in FIG. 5) from the position sensor 1. Moreover, it should be appreciated that the sensor current draw is reduced because the average current 76 reduced due to the cycling of power to the sensor. The sampling collected during the modulation exceeds the predetermined required output data rate therefore the sampling process does not need to occur at 100% but may be reduced which in turn reduces the average current 76.

Figure 5:
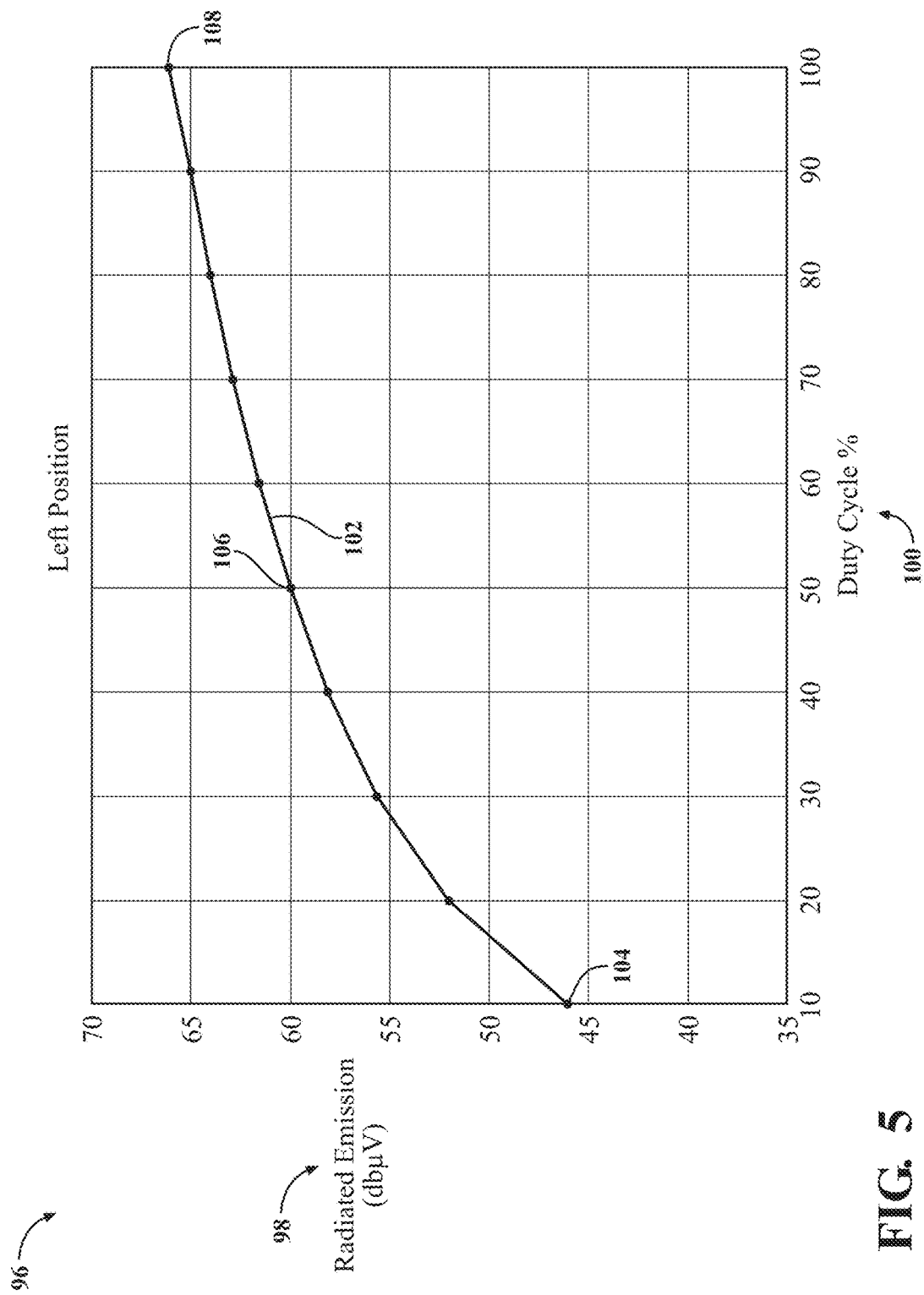
FIG. 5 is a characteristic curve of an average radiated emission versus the duty cycle percentage, according to one or more embodiments shown and described herein.

With reference to FIG. 5 now, a characteristic curve of the average radiated emission 98 versus the duty cycle percentage 100 is depicted. The graph 96 is plotted as the average radiated emission (dbµ V) 98 versus the duty cycle percentage 100 curve. As shown, the plot forms a continuously increasing curve 102 where a tangent to the curve is positive from any duty cycle percentage 10% through 100%. It should be appreciated that while the duty cycle percentage 100 is graphed between 10% and 100%, the duty cycle percentage 100 may be less than 10%. As the duty cycle percentage 100 increases, so does the average radiated emission 98.

As an example, the duty cycle percentage 100 at 10% intersects the average radiated emission 98 at intersection 104, which indicates that, at this duty cycle percent, the average radiated emission is approximately 46 dbµ V. On the other hand, the duty cycle percentage 100 at 50% intersects the average radiated emission 98 at intersection 106, which indicates that, at this duty cycle percent, the average radiated emission is approximately 60 dbµ V. Further, in another example, the duty cycle percentage 100 at 100% intersects the average radiated emission 98 at intersection 108, which indicates that, at this duty cycle percent, the average radiated emission is approximately 67 dbµ V. Therefore, there is a correlation ratio between the duty cycle 100 and the average radiated emissions 98. For example, the 10% duty cycle on the position sensor produces the average radiated emissions of approximately 46 dbµ V while the 100% duty cycle, i.e. constant on, produces the average radiated emissions of approximately 67 dbµ V.

The correlation has a reduction in dB directly correlating with the ratio of on to off time. Specifically, the reduction in the average radiated emissions 98 follows the standard Log 20 curve in dB. For example, at 50% duty cycle percentage 100, the average radiated emissions 98 equates to a −6 dB drop, as compared to constant on (i.e. 100% duty cycle), at 25% duty cycle percentage 100 there is an additional 6 dB drop in the average radiated emissions 98 and at 10% there is 20 dB ([20 Log (0.1)]) drop in the average radiated emissions 98.

As discussed previously, the emission standards have been established to set a peak and average emission limits. The peak emission limit is set the maximum amplitude of the oscillation, whereas the average is set by how long the oscillation is active over a set amount of time. Therefore, by controlling the average radiated emissions 98, the standards, particularly for Europe, may be met.

Figure 6:
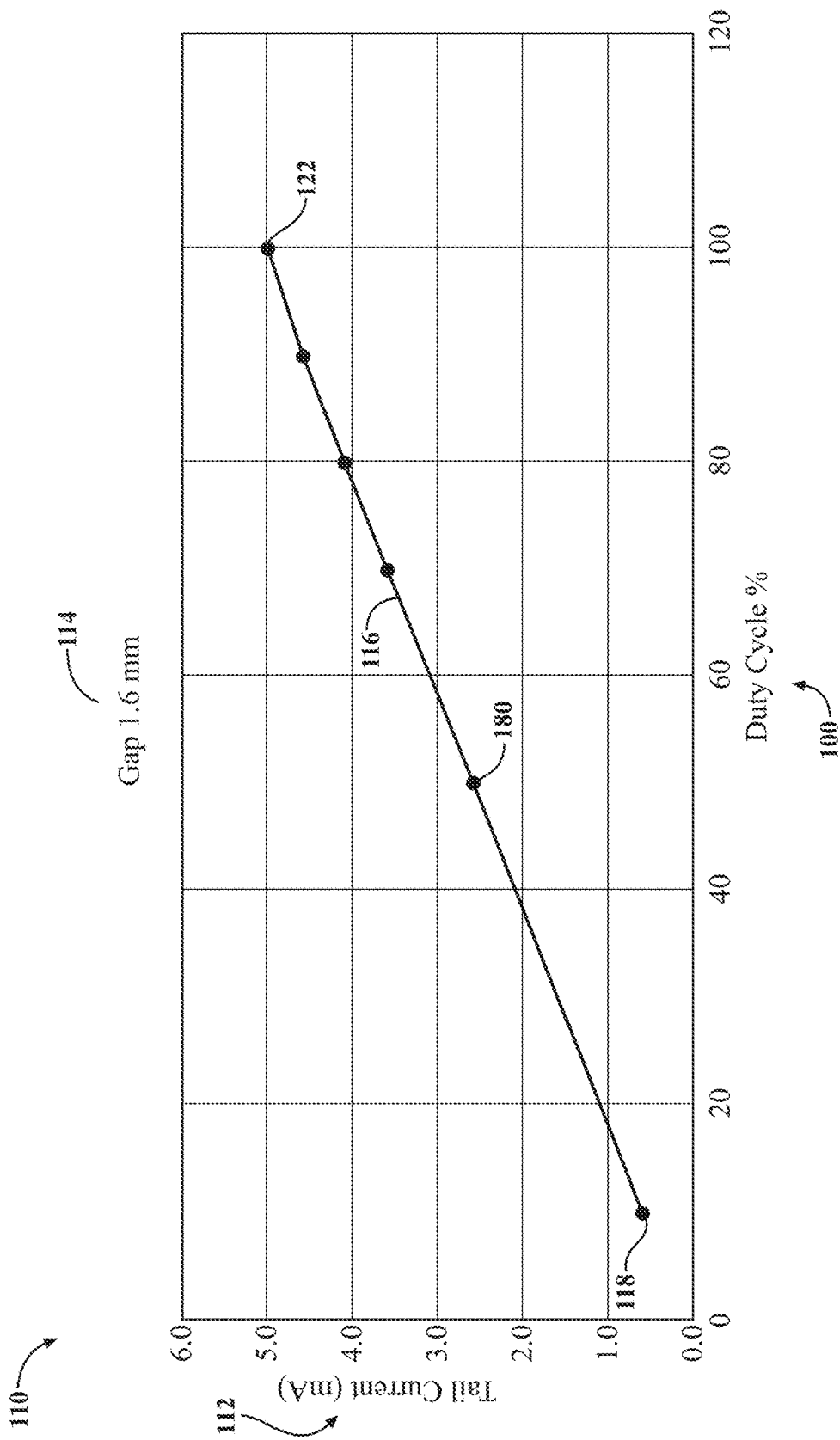
FIG. 6 is a characteristic curve of a tail current versus the duty cycle percentage of FIG. 1, according to one or more embodiments shown and described herein.
Figure 7:
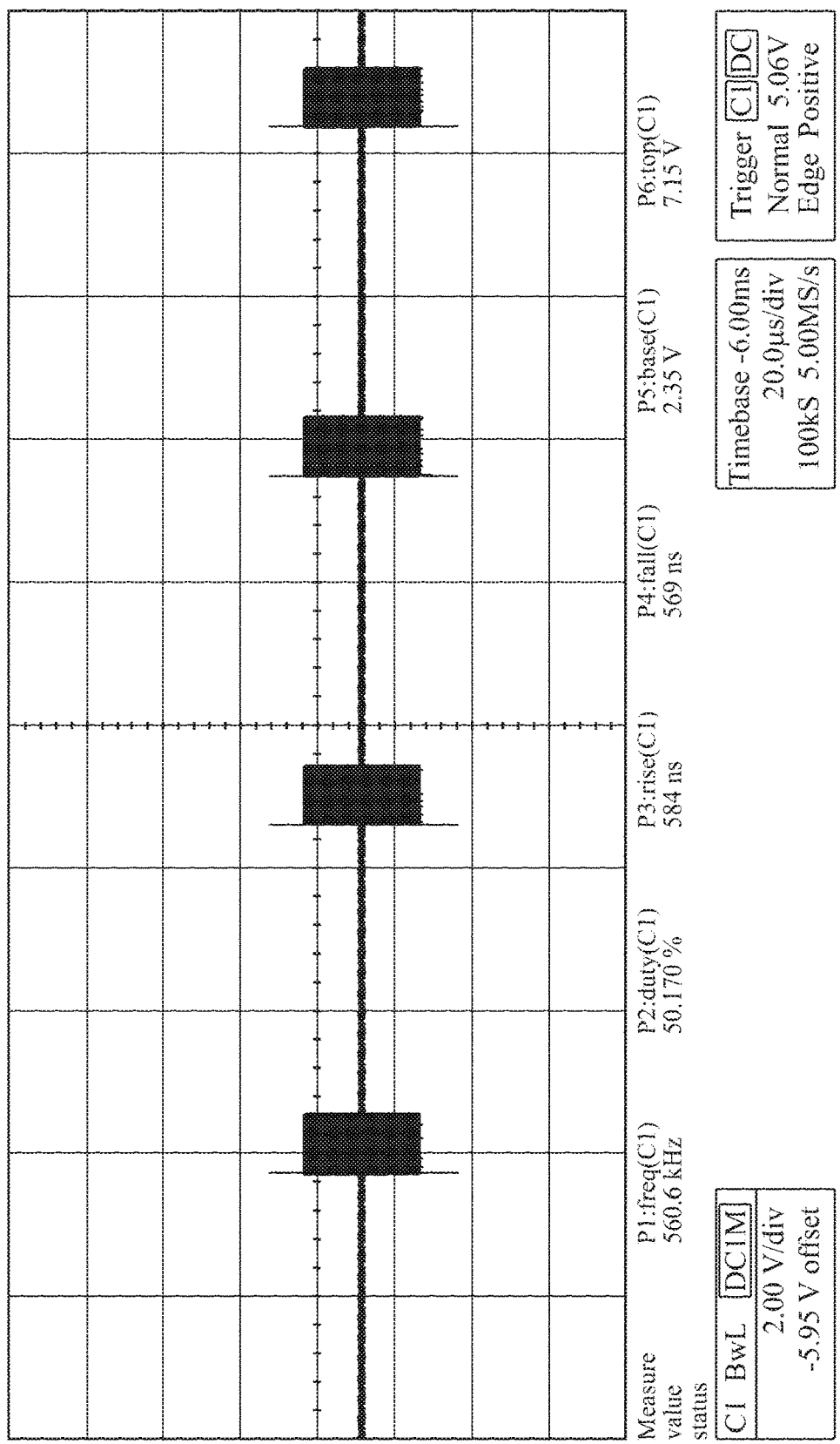
FIG. 7 is an expanded view of a characteristic curve at 200 Hertz modulation of the inductive position sensor, according to one or more embodiments shown and described herein.
Figure 8:
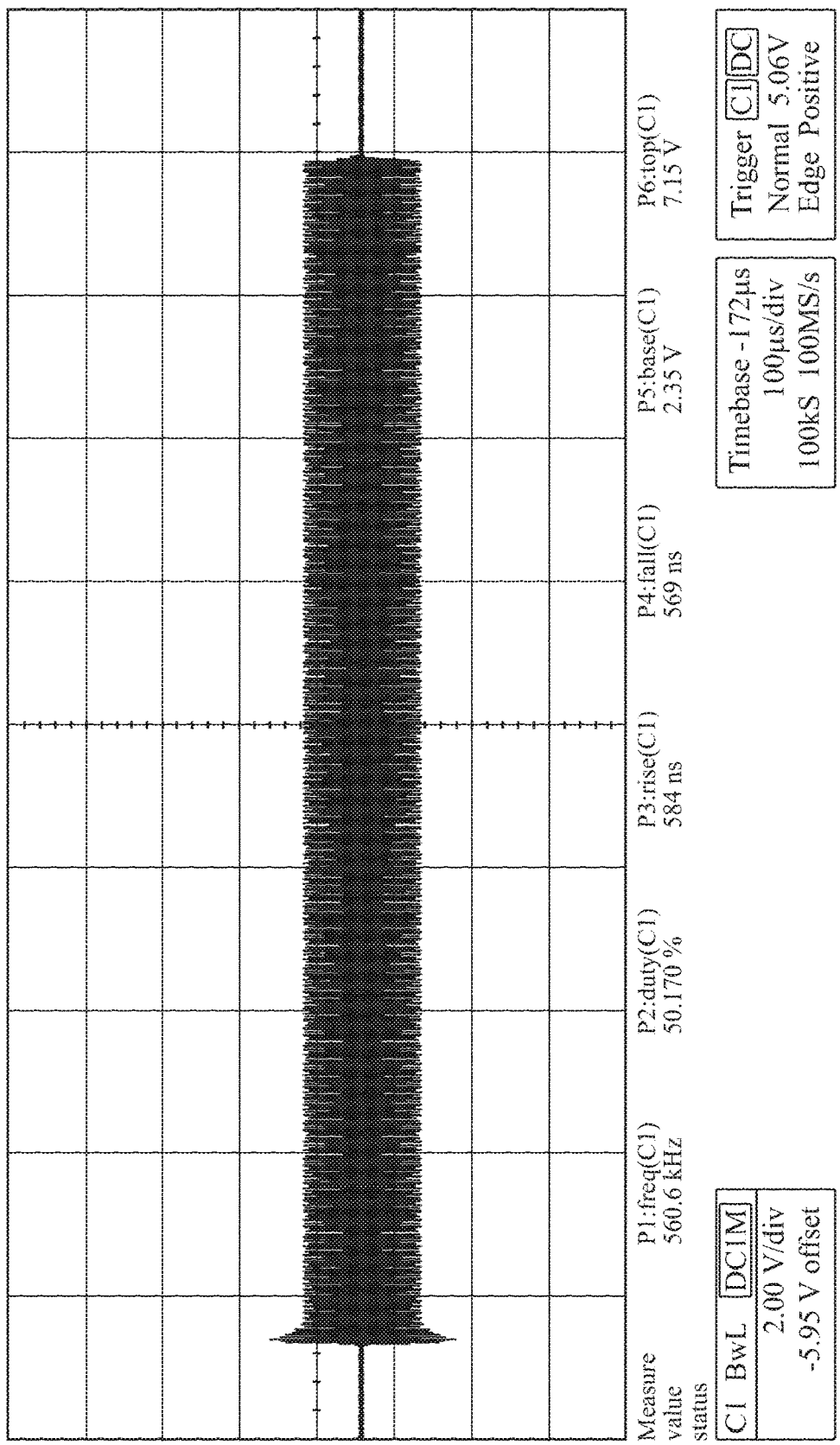
FIG. 8 is a close-up view of a single sampling at 200 Hertz modulation of the inductive position sensor, according to one or more embodiments shown and described herein.
Figure 9:
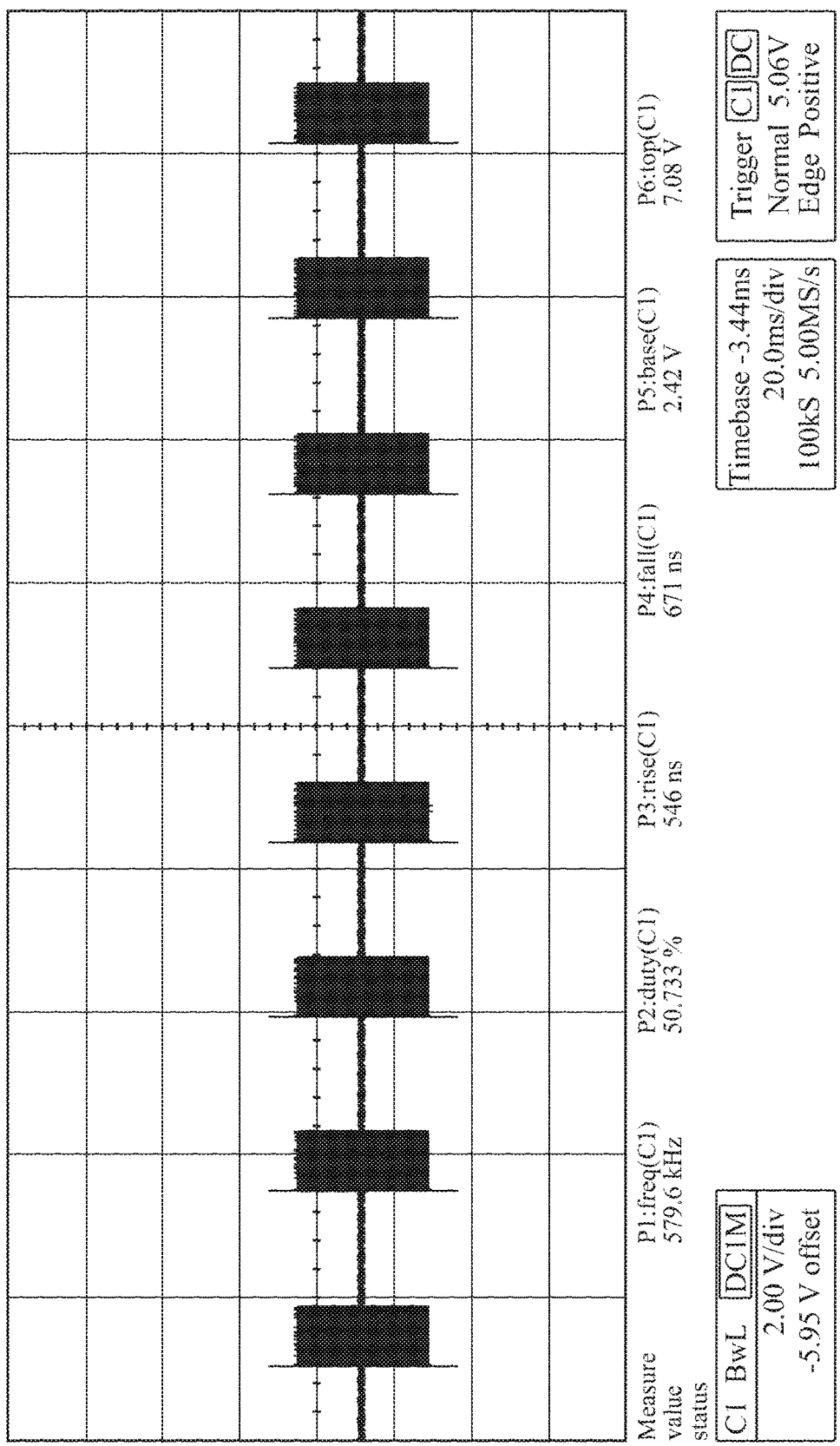
FIG. 9 is an expanded view of a characteristic curve at 400 Hertz modulation of the inductive position sensor, according to one or more embodiments shown and described herein.
Figure 10:
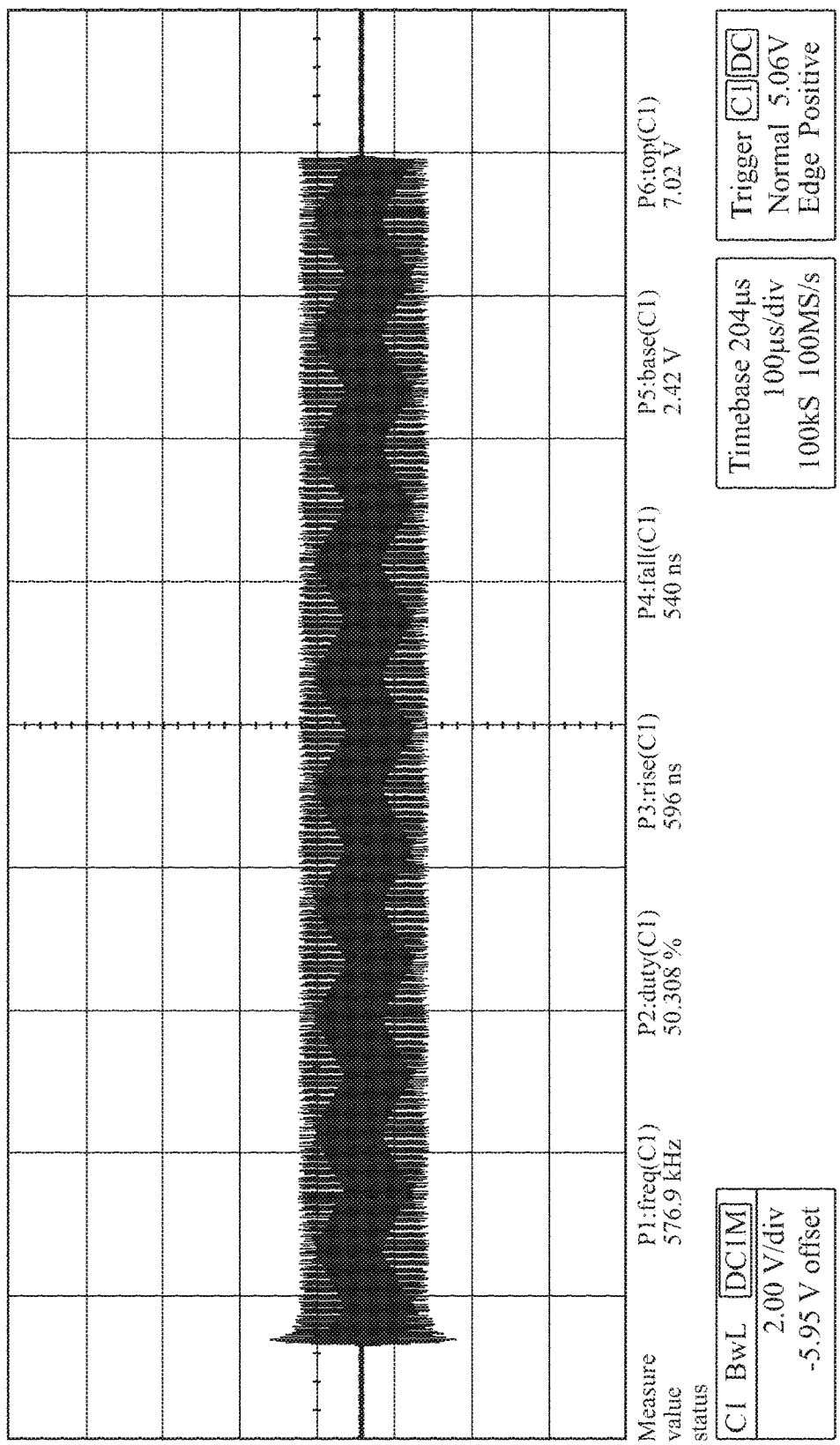
FIG. 10 is a close-up view of a single sampling at 400 Hertz modulation of the inductive position sensor, according to one or more embodiments shown and described herein.
Figure 11:
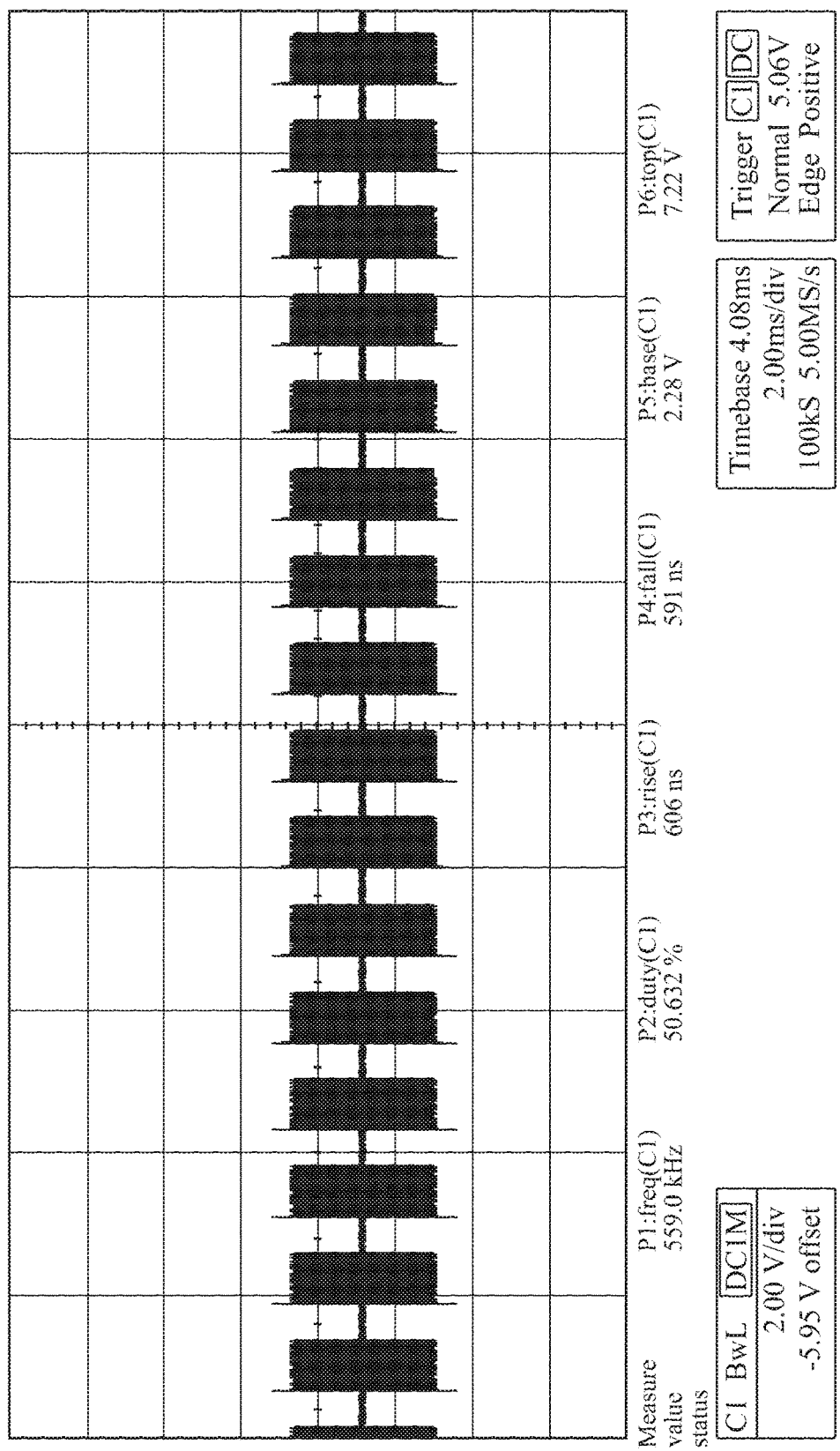
FIG. 11 is an expanded view of a characteristic curve at 800 Hertz modulation of the inductive position sensor, according to one or more embodiments shown and described herein.
Figure 12:
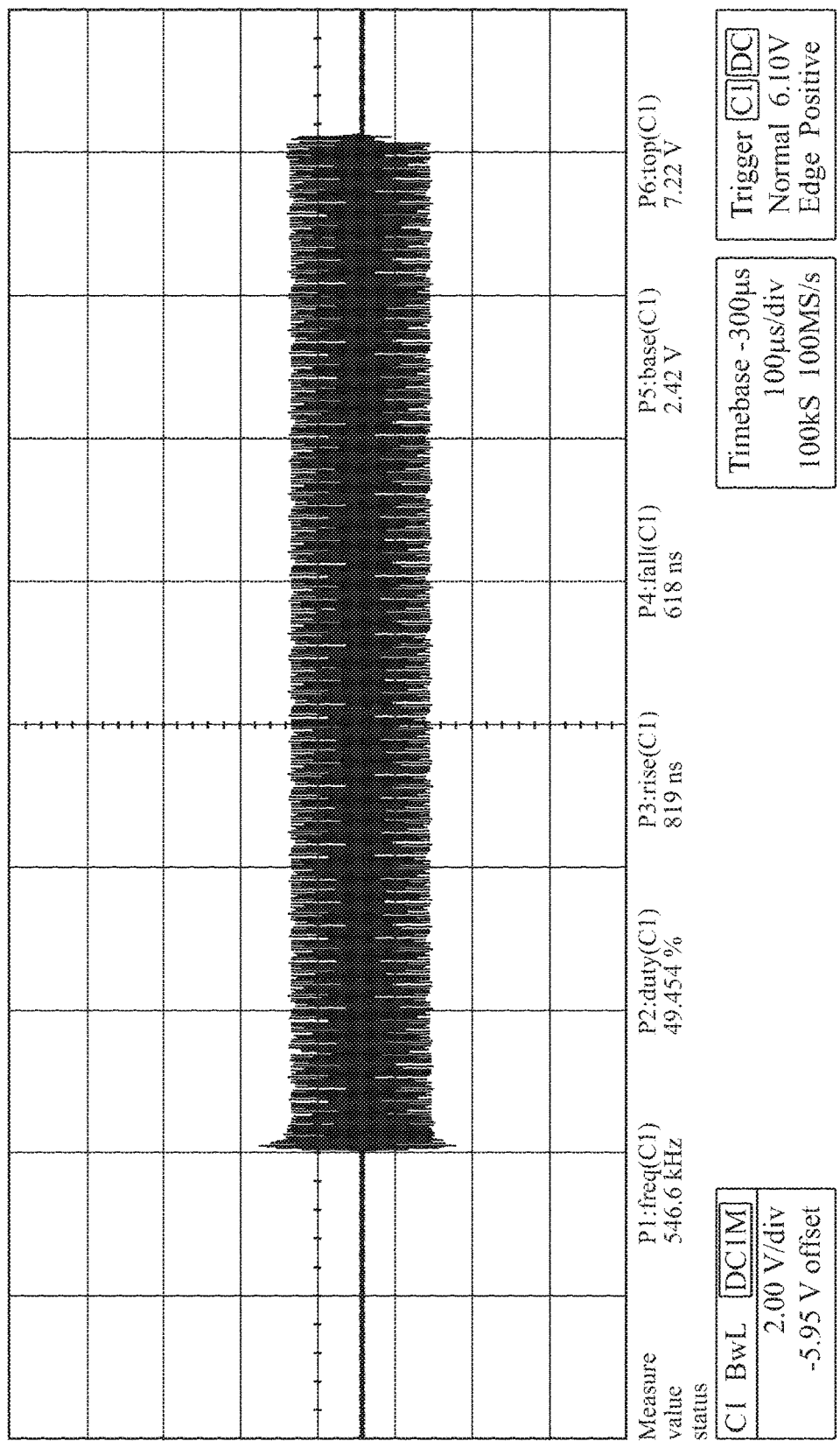
FIG. 12 is a close-up view of a single sampling at 800 Hertz modulation of the inductive position sensor, according to one or more embodiments shown and described herein.

Now referring to FIG. 6, a characteristic curve of a tail current versus the duty cycle percentage is depicted. The graph 110 is plotted as the current (mA) 112 versus the duty cycle percentage 100 curve at the airgap 114 of 1.6 mm. It should be appreciated that the airgap 114, the distance between the sensor board and the coupler or the gap between the transmitter coil and the coupler element, may be greater or less than 1.6 mm. For illustrative purposes and not to limit the claims, the 1.6 mm gap is being used. It should also be appreciated, that the closer the air gap, generally, there is a less likelihood of exceeded the peak or the average emission limits. However, it should also be appreciated that a small physical airgap may not be feasible in mass, low cost production, thus the need for electronic reduction in emissions.

As shown, the plot forms a second continuously increasing curve 116 where a tangent to the curve is positive from any duty cycle 10%-100%. It should be appreciated that while the duty cycle percentage 100 is graphed between 10% and 100%, the duty cycle may be less than 10%. As the duty cycle percentage 100 increases, so does the average current 112.

As an example, the duty cycle percentage 100 at 10% intersects the average current 112 at an intersection 118, which indicates that, at this duty cycle percent, the average current is approximately 0.6 mA. On the other hand, the duty cycle percentage 100 at 50% intersects the average current 112 an intersection 120, which indicates that, at this duty cycle percent, the average current 112 is approximately 2.6 mA. Further, in another example, the duty cycle percentage 100 at 100% intersects the average current 112 at an intersection 122, which indicates that, at this duty cycle percent, the average current 112 is approximately 5.0 mA. Therefore, there is a correlation between the duty cycle percentage 100 and the average current 112.

There is a reduction in the average current 112 directly correlating with the ratio of on to off time. Specifically, the reduction in the average current 112 is directly related to the percent of duty cycle percentage 100 applied to the position sensor at an airgap 114 of 1.6 mm. It should be appreciated that as the airgap 114 is changed, the correlation may also change. However, the second continuously increasing curve 116 will remain continuously increasing; thus, as the duty cycle percentage 100 increases, so does the average current 112.

As discussed previously, this reduction in average current directly reduces the sensor's current draw and the total current supplied which reduces the average radiated emissions.

With Reference to FIGS. 7-12, frequencies are shown having the drive oscillator 14 and the duty cycle enabled together. The frequencies may range from 200 Hz, 400 Hz, 800 Hz (or ½, ¼, to ⅛$^{th}$ of a nominal 1600 Hz data rate).

As should be appreciated by those skilled in the art, the reduction of radiated emissions using a duty cycle and/or modulation, does not impact the hardware of the position sensor. Further, due to the slow speed of typical position sensing in the 2 KHz range compared to sampling and startup speed of the sensor, the higher operating frequency, in the 4 MHz range, may be used and output date at the slower rate using modulation, while still maintaining a higher internal sample rate.

I claim:

1. A position sensor system comprising:
    an inductive position sensor having a transmitting coil and at least one receiving coil;
    a coupler attached to a shaft, the shaft configured for rotation, the coupler overlays at least a portion of the at least one receiving coil, the coupler is spaced apart from the transmitting coil and the at least one receiving coil creating an air gap;
    an electronic control unit comprising an oscillator drive, the electronic control unit operably connected to the oscillator drive, the oscillator drive enables an oscillation signal configured to enable the inductive position sensor at a predetermined time; and a start duty cycle and a stop duty cycle controlled by the electronic control unit at a predetermined rate of time, the start duty cycle and the stop duty cycle operating at a predefined frequency and a predefined ratio, wherein the inductive position sensor initiates transmitting a sample to the electronic control unit when the oscillating signal and the start duty cycle are both enabled, the sample being a position of the coupler and the shaft relative to the inductive position sensor, and wherein the start duty cycle and the stop duty cycle is configured to reduce an average radiated emission of the inductive position sensor.

2. The position sensor system of claim 1, wherein the predetermined time is a minimum time required for the second signal to provide a stable sample.

3. The position sensor system of claim 1, wherein the sample is held until a second sample is taken, until n samples are taken.

4. The position sensor system of claim 1, wherein the inductive position sensor has an air gap between the transmitter coil and the coupler greater than 1.0 millimeter.

5. The position sensor system of claim 1, wherein a predefined frequency is 400 hertz.

6. The position sensor system of claim 1, wherein a predefined frequency is 200 hertz.

7. The position sensor system of claim 1, wherein a predefined frequency is 800 hertz.

8. The position sensor system of claim 1, wherein the predetermined rate of time is 10 percent.

9. The position sensor system of claim 1, wherein the predetermined rate of time is greater than 10 percent.

10. The position sensor system of claim 1, wherein the predetermined rate of time is less than 10 percent.

11. The position sensor of claim 1, wherein the position sensor system has an output operating frequency of 2 kilohertz or less, the electronic control unit is operating at a 400 hertz, the electronic control unit over the predetermined rate of time permits an output of data at the output operating frequency of 2 kilohertz or less while permitting the operating frequency of 400 hertz for an internal sample rate.

12. A vehicle having a sensor system, the vehicle comprising:
an inductive position sensor having a transmitting coil and at least one receiving coil;
a coupler attached to a shaft, the shaft configured for rotation, the coupler overlays at least a portion of the at least one receiving coil, the coupler is spaced apart from the transmitting coil and the at least one receiving coil creating an air gap;
an electronic control unit comprising an oscillator drive, the electronic control unit operably connected to the oscillator drive, the oscillator drive operably connected to the inductive position sensor so to transmit an oscillating signal; and
a pulse width modulation signal having a duty cycle, the pulse width modulation signal controlled by the electronic control unit at a predetermined period of time, the duty cycle operating at a predefined proportion of time,
wherein a sample of the inductive position sensor position is obtained when the oscillating signal and the duty cycle are both enabled such that only a single sample is required for the predefined proportion of time, the sample being a position of the coupler and the shaft relative to the inductive position sensor,
wherein the oscillator drive is inhibited a remaining time of the predefined proportion of time so to reduce power consumption and emissions of the inductive position sensor.

13. The position sensor system of claim 12, wherein the predetermined time is a minimum time required for the inductive position sensor to transmit a stable sample.

14. The position sensor system of claim 13, wherein the sample is held by the electronic control unit until a second sample is taken during a next period of time when the oscillation signal and the duty cycle are both enabled.

15. The position sensor system of claim 12, wherein the air gap between the transmitter coil and the coupler is greater than 1.0 millimeter.

16. The position sensor system of claim 12, wherein the duty cycle is a periodic clock signal, the predetermined period of time of the periodic clock signal is 10 percent.

17. The position sensor system of claim 12, wherein the duty cycle is a periodic clock signal the predetermined period of time of the periodic clock signal is greater than 10 percent.

18. The position sensor system of claim 12, wherein the duty cycle is a periodic clock signal, the predetermined period of time of the periodic clock signal is less than 10 percent.

19. The position sensor system of claim 12, wherein repeat multiples of the sample of the inductive position sensor position are processed by the electronic control unit until the oscillation signal and the duty cycle both change states.

* * * * *